Patented Dec. 2, 1930

1,783,365

UNITED STATES PATENT OFFICE

RICHARD W. LEWIS, OF MONTCLAIR, NEW JERSEY

DISPERSION AND METHOD OF MAKING THE SAME

No Drawing.   Application filed February 28, 1927.   Serial No. 171,726.

My invention relates to the manufacture and use of dispersions in a volatile non-solvent vehicle of substances protective against water and corrosion; such dispersions being affected and maintained by the aid of non-volatile dispersing agents. More particularly it relates to dispersions in water of asphalts and other bituminous substances. These dispersions are intended to function, after evaporation of the vehicle, as protective coatings or as bonding or cementing media.

Such dispersions are, as a class, old and well known in the arts, but all that I have investigated have been deficient in resistance to the conditions of service and hence in protective value. The reason for this lies in the fact that the dispersing agent, being non-volatile, remains associated with the dispersed substance after the evaporation of the vehicle, and that the effect of this association has not been sufficiently considered. For instance, if a water soluble dispersing agent, such as soap, has been employed, the continued presence of this soluble substance remains a source of weakness when the dried dispersion is exposed to water, and may and often does result in the complete disintegration of the dried mass during such exposure. It is frequently claimed that on drying, the dispersing agent is completely absorbed within the dried mass of protective substance. In no case that I have investigated have I found this to be true. On the contrary, in every case I have found that even after drying for some weeks a considerable proportion of the agent will be found separating particles of the originally dispersed substance, and in many cases forming a continuous phase enclosing these particles. This appears to be true even when the agent employed is "soluble" in or completely miscible with the dispersed substance, and is particularly true when the agent, clay, for instance, is insoluble in the dispersed substance.

Since in the dried dispersion the dispersing agent will remain as a more or less continuous net-work surrounding the originally dispersed particles it is apparent that if this agent be of such a nature as to be dissolved, softened, gelatinized, or even merely mechanically displaced by water from its contact with the dispersed particles, then the dried mass or coating will lose its cohesive and adhesive properties and will fail through physical disintegration even though the individual particles of protective substance are not themselves deleteriously affected. Such failure under exposure to water is frequent if not inevitable with those so-called "asphalt emulsions" now on the market in which soap or clay is used as the dispersing agent, and constitutes a serious objection to their use for protective purposes.

I have discovered that by a suitable choice of dispersing agents the weakening and disintegrating effects of water on the dried dispersions can be overcome or effectively retarded over a very long period of time, so that where ordinary dispersions will fail after a few hours, days or weeks of exposure, dried dispersions of my composition will retain their bond and strength of body over a period of years. Further, this extreme resistance is developed immediately on the first drying of the material, and is not dependent on heat or on initial drying prolonged over days or weeks.

Certain combinations of dispersing agents which I have found effective are described and claimed in my co-pending applications (Serial Nos. 721,282 and 33,304).

As typical of a material to be dispersed I will take as an example of protective material such as a steam-reduced Mexican asphalt of 100 to 150 penetration, although by suitable variations in technique I have successfully dispersed many other substances, particularly a wide range of asphalts.

The actual dispersion may be effected by any of a number of known procedures. In the procedure here described the dispersing agent contains both Portland cement and aluminum hydrate but the technique employed would be the same if either substance were used alone as the dispersing agent. The following would be found convenient, and would enable any one skilled in the art to produce the compositions described: Place about 15 pounds of gelatinous aluminum hydrate of paste in a suitable mixer. Any of the following well-known types of mixers are suitable: the ordinary "pony" paint mixer, propeller mixers, soap crutchers, mixers of the "Werner & Pfleiderer" type. Stir until free from lumps. Add slowly with stirring about 15 pounds of Portland cement and about 30 pounds of water. Stir until paste is homogeneous.

The Portland cement used is the ordinary commercial powdered product, and may be used with or without having been previously slaked in a large excess of water. The gelatinous aluminum hydrate may also be obtained commercially, usually under the name of "aluminum hydrate, gelatinous", or "aluminum hydrate paste", both of which typically contain about 20% of hydrate and 80% of water.

With constant stirring add melted asphalt in a thin stream. Add also water as needed to maintain a smooth consistency. Means may be provided for cooling or heating to maintain in the mass an optimum working temperature which is easily found by trial. The asphalt disperses as it is stirred into the mass in the mixer.

The addition of asphalt may be discontinued at any point in the process depending on the ratio of asphalt to agent desired in the finished product. As this ratio increases, the grain size of the dispersed asphalt usually increases and there is a gradation of the other properties as well. For each agent and given set of working conditions there is a critical ratio which may not be exceeded without inversion of the dispersion. Short of this critical ratio any ratio may be made as desired. A typical batch made as described with thirty pounds of mixed agent would contain in addition to the agent about 120 to 160 pounds of asphalt and about 65 to 80 pounds of added water. The dispersions referred to are of the type in which water constitutes the external or continuous phase, and they are so stable that they may at any time after manufacture and before use be changed in consistency by the addition or subtraction of water as required to meet particular conditions of use. They are further so stable as to resist coagulation by any of the common reagents, and may for particular purposes be mixed with such reagents before use.

The process may of course be made semi-continuous by withdrawing part of the dispersion when the desired ratio has been reached, and then building up again by adding fresh quantities of agent, followed by water and asphalt; or it may be made continuous by steadily withdrawing part of the contents of the mixer while adding fresh asphalt, agent and water in the desired proportions. The substance to be dispersed is most conveniently in the liquid state at the time of its introduction into the dispersing apparatus. This state may be normal to the material at atmospheric temperature, or, as would readily occur to any one skilled in the art, the material may be brought to this state by heat or by fluxing with solvent.

The admixture of aluminum hydrate with Portland cement permits obtaining higher ratios of asphalt to agent than by the use of Portland cement alone, and in addition increases the water resistance of the dried dispersion to a degree greater than that obtainable with either agent used alone. I have found to be particularly useful a mixture by weight of substantially one part of gelatinous aluminum hydrate to one part Portland cement, when used to disperse three and one-half to five parts of asphalt, but to secure special properties I may vary widely the proportion of each constituent, and have found such mixtures within very wide limits to possess valuable and unique properties. Also, dispersions made with a mixture of Portland cement and aluminum hydrate may sometimes to advantage for special purposes be subsequently mixed with additional quantities of Portland cement, as for example in those cases where a pipe is coated with one of the dispersions mentioned above and thereafter this coating is in turn covered with another coating of the same dispersion to which has been added more Portland cement, or the pipe may be coated originally with a paste composed of an original dispersion to which has been added additional Portland cement, and this practice is available for pipes which are to be buried in the earth.

For coatings which are to afford maximum protection and hence must be highly adhesive and resistant; and where a certain softness in the coating is not undesirable a pure dispersion of soft asphalt, made with an agent containing both Portland cement and aluminum hydrate, and in which the ratio of asphalt to agent is fairly high, is to be preferred; but it is obvious that many compositions useful for special purposes can readily be made by special selection of the bitumen to be dispersed, by varying the proportion of each ingredient, and by subsequently mixing with such dispersions various fillers, such as mineral or vegetable fibres; sand, infusorial earth or other forms of silica; pulverized minerals, carbon and the like.

What I claim is:

1. A dispersion of bitumen in water in which the dispersing agent is Portland cement.

2. A dispersion comprising bitumen in water, Portland cement and gelatinous aluminum hydrate.

3. In a dispersion of bitumen in water, a dispersing agent comprising powdered Portland cement.

4. In a dispersion of bitumen in water, a dispersing agent consisting of gelatinous aluminum hydrate and Portland cement.

5. In a dispersion of bitumen in water, a dispersing agent consisting of substantially equal parts of aluminum hydarte paste and Portland cement.

In testimony whereof I hereto affix my signature.

RICHARD W. LEWIS.